No. 783,034. Patented February 21, 1905.

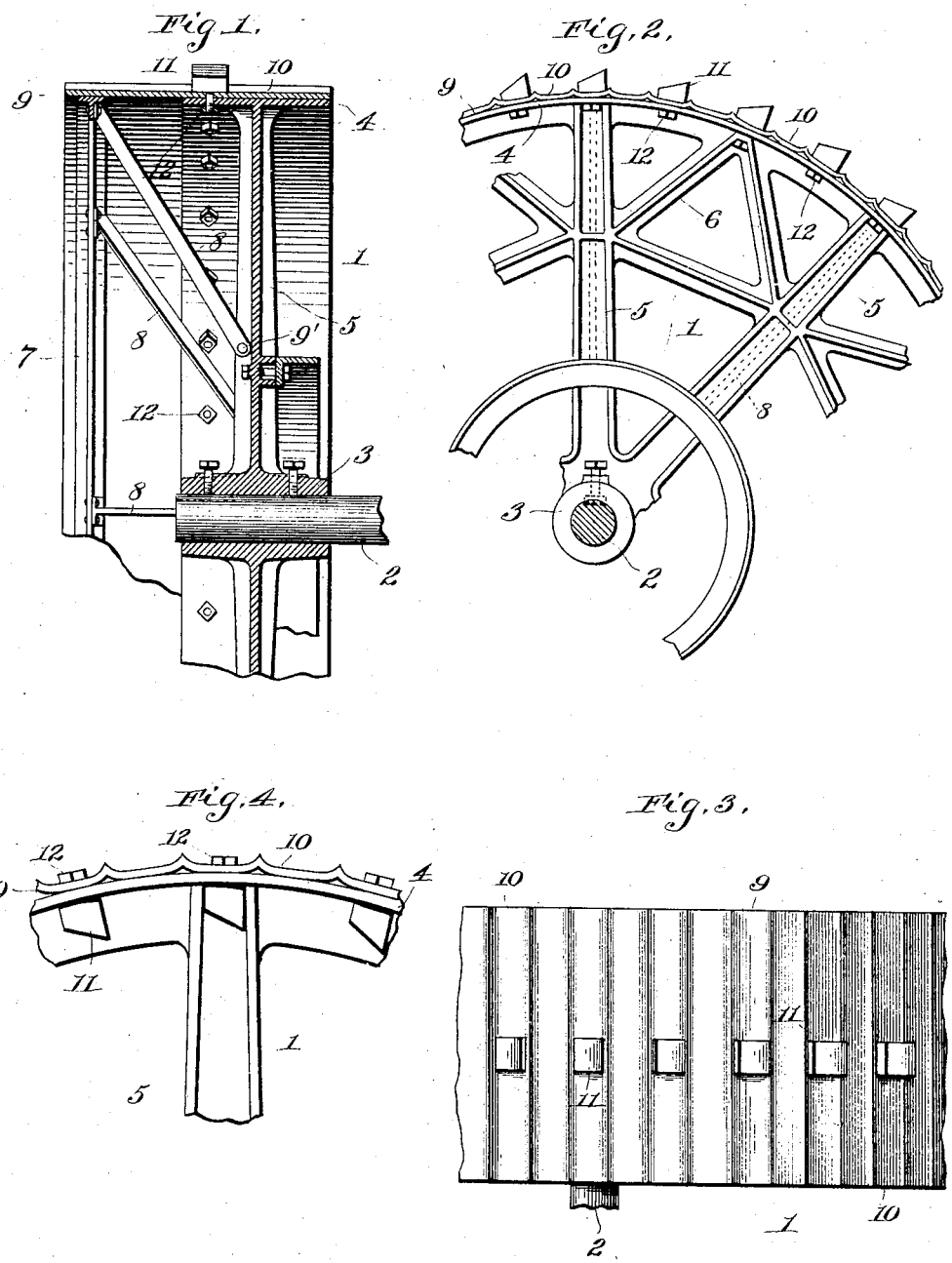

UNITED STATES PATENT OFFICE.

FRED AUGUST GERLING, OF PORTLAND, OREGON.

TRACTION-WHEEL.

SPECIFICATION forming part of Letters Patent No. 783,034, dated February 21, 1905.

Application filed June 7, 1904. Serial No. 211,518.

*To all whom it may concern:*

Be it known that I, FRED AUGUST GERLING, a citizen of the United States, residing at Portland, in the county of Multnomah and State of Oregon, have invented a new and useful Traction-Wheel, of which the following is a specification.

This invention relates to improvements in devices of that class known as "traction-wheels" and used on traction-engines, agricultural machinery, and the like, the principal object of the invention being to provide for the extension of the tread of the wheel rendered necessary by the character of the ground on which the engine is to travel.

A further object of the invention is to provide an extended tread portion which may be readily secured in position and removed without difficulty when the tread of the wheel proper is sufficient.

With these and other objects in view, as will more fully hereinafter appear, the invention consists in the novel construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a sectional elevation of a portion of a traction-wheel constructed in accordance with the invention. Fig. 2 is a side elevation of the same. Fig. 3 is a plan view of a portion of the tread. Fig. 4 is a detail view corresponding to Fig. 2 and showing the auxiliary tread-blocks in position.

Similar numerals of reference are employed to indicate corresponding parts throughout the several figures of the drawings.

The traction-wheel 1 is mounted on an axle 2 and includes a hub member 3 and a rim or felly 4, that are connected together by a plurality of spokes 5, the spokes being further braced by cross-bars 6, arranged in triangular form between the rim and adjacent spokes. The rim or tread 4 of the wheel is made of a width sufficient for ordinary purposes; but in many cases the engine must be used on soft ground and a broader tread is found necessary.

In carrying out the present invention an auxiliary rim member 7 is employed, said rim being circular in form and preferably of T shape in cross-section, resembling in many respects the rim of the wheel 1. The auxiliary rim is secured to the main wheel by means of a plurality of obliquely-disposed tie-bars 8, and the connections of these tie-bars with the radial spokes 5 of the main wheel are such as to permit of the play necessary to bring the auxiliary rim into proper relative position with the rim of the main wheel. To the auxiliary rim is secured a tread 9, formed of a strip of metal provided with transverse corrugations 10, the strip being of any desired width and being preferably shaped in order to fit snugly over the periphery of the rim 4.

The supplemental rim, the auxiliary tread, and the tie-rods 8 are all properly assembled, and in placing the device in position the tie-rods are first secured by bolts 9' to the webs of the radial spokes 5 of the main wheel. When this is accomplished, the auxiliary tread is secured to the main rim 4 by means of a plurality of bolts, and preferably these bolts form the shanks of teeth or blocks 11, that project beyond the tread in order to increase the tractive force of the engine, said blocks having pointed edges for engagement with the ground and their outer faces being on lines oblique to the lines of the side edges of said teeth or blocks, these extending in an approximately radial direction. The blocks are arranged on the corrugated tread at points between the ribs, so that the weight of the machine that is exerted on said blocks may be transferred to the auxiliary tread and thence directly to the rim 4, thus preventing danger of injury to said auxiliary tread. The bolts are passed through suitable bolting-openings in the auxiliary rim 4, and their inner ends serve to receive lock-nuts 12, or in some cases the tread-blocks may be reversed and disposed inside of the wheel, while the nuts are arranged at the outer surface of the tread; but said nuts when placed in the lower portion of the corrugations—that is to say, between the ribs—will be effectually protected from wear, so that the bolts will not be upset or otherwise damaged to such an extent as will prevent the ready removal of the nuts when the tread-blocks or teeth are to be placed outside the auxiliary tread. With a device of this character the auxiliary tread may be readily placed in position without the employment of specially skilled labor and may be quickly removed when not needed.

Having thus described the invention, what is claimed is—

1. In traction-wheels, an auxiliary rim, obliquely-disposed arms for connecting the same to the spokes of the traction-wheel, and an auxiliary tread encircling both the main and auxiliary rims and connected to both of them.

2. The combination with a traction-wheel having a rim, of an auxiliary rim member, a plurality of obliquely-disposed tie-rods connecting said auxiliary rim to the spokes of the main wheel, an auxiliary tread member carried by the auxiliary rim, and securing-bolts for connecting the auxiliary tread to the main rim.

3. In traction-wheels, an auxiliary rim member, a continuous circular tread formed of corrugated metal, said tread being secured to the auxiliary rim, and securing-bolts connecting the auxiliary rim to the main rim, said bolts extending through that portion of the corrugated tread between adjacent ribs of the latter.

4. In traction-wheels, an auxiliary rim member, an auxiliary tread formed of a continuous ring of transversely-corrugated metal, auxiliary traction-blocks seated on the corrugated tread at points between adjacent ribs of the latter, tread-bolts forming a part of said blocks and extending through openings in the tread of the main rim, said bolts and blocks being reversible to permit the placing of the blocks inside the ring, and lock-nuts adapted to the tread portions of said bolts.

In testimony that I claim the foregoing as my own I have hereto affixed my signature in the presence of two witnesses.

FRED AUGUST GERLING.

Witnesses:
 F. C. HOECKER,
 W. F. BURNEY.